(12) United States Patent
Chen et al.

(10) Patent No.: US 9,885,341 B2
(45) Date of Patent: Feb. 6, 2018

(54) POWER CONTROL SYSTEM FOR GENERATING ELECTRICITY AND STORING CIRCULATION ENERGY

(71) Applicants: Shuo-Yan Chen, Kaohsiung (TW); Shuo-Ci Chen, Kaohsiung (TW)

(72) Inventors: Shuo-Yan Chen, Kaohsiung (TW); Shuo-Ci Chen, Kaohsiung (TW)

(*) Notice: Subject to any disclaimer, the term of this patent is extended or adjusted under 35 U.S.C. 154(b) by 213 days.

(21) Appl. No.: 15/044,139

(22) Filed: Feb. 16, 2016

(65) Prior Publication Data

US 2017/0184075 A1 Jun. 29, 2017

(30) Foreign Application Priority Data

Dec. 28, 2015 (TW) .............................. 104144012 A

(51) Int. Cl.
 *F03D 9/00* (2016.01)
 *F03D 9/25* (2016.01)
 *H02K 7/02* (2006.01)
 *H02K 47/00* (2006.01)
 *H02K 53/00* (2006.01)

(52) U.S. Cl.
 CPC ............. *F03D 9/007* (2013.01); *F03D 9/002* (2013.01); *F03D 9/25* (2016.05); *H02K 7/02* (2013.01); *H02K 47/00* (2013.01); *H02K 53/00* (2013.01)

(58) Field of Classification Search
 CPC ........... H02K 7/02; H02K 47/00; H02K 53/00
 See application file for complete search history.

(56) References Cited

U.S. PATENT DOCUMENTS

2017/0110882 A1* 4/2017 Shelton .................. H02J 3/383

* cited by examiner

*Primary Examiner* — Robert Deberadinis
(74) *Attorney, Agent, or Firm* — Alan D. Kamrath; Kamrath IP Lawfirm, P.A.

(57) ABSTRACT

A power control system includes a control unit, a motor, an electricity storing unit, and a generator set. The control unit includes a charging/driving controller and a load controller electrically connected to a load. The motor can be driven by electricity of the electricity storing unit. The generator set includes a revolving wheel which is driven by the motor for driving a driving power generator and an energy storage generator. The driving power generator provides electricity to the load. Electrical energy generated by the energy storage generator is used for charging the electricity storing unit. When the generator set breaks down, the electricity of the electricity storing unit is provided to the load through a control of the charging/driving controller. The power control system supplies sufficient electrical energy to the load under low energy consumption condition and has advantages of environment protection and fault alarm.

7 Claims, 3 Drawing Sheets

POWER CONTROL SYSTEM FOR GENERATING ELECTRICITY AND STORING CIRCULATION ENERGY

BACKGROUND OF THE INVENTION

The present invention relates to a power control system for generating electricity and for storing circulation energy and, more particularly, to a power control system which can maintain enough electrical energy provided to a load under low energy consumption condition.

The electricity for providing to conventional equipments (such as a lamp of public lighting) was generally electric supply. The electricity of the electric supply is mainly obtained from thermal power plants and nuclear power plants. An operation of the thermal power plant would result in air pollution, and an operation of the nuclear power plant would lead to irradiation risk. In order to achieve an objective of no pollution and no irradiation, wind energy generation and solar power generation are currently the widely-promoted solution of green energy (renewable energy). In more details, electricity generated from a wind energy generator and/or a solar power generator is stored in a battery for providing electricity to a load such as a street light at night. However, for the wind energy generation and the solar power generation, stability of degree of electricity is not good and electricity generated is low. When a quantity of electricity in the battery is not sufficient, it is necessary to connect to the electric supply to supply electrical energy to the load. Additional fuel is generally added to drive when the conventional electricity generators are operated, thus the cost and the energy consumption are high.

BRIEF SUMMARY OF THE INVENTION

It is an objective of the present invention to provide a power control system for supplying sufficient electrical energy to a load to operate under low energy consumption condition by a design of power driving generation and circulation storing energy. The power control system further has advantages of environment protection and fault alarm.

It is another objective of the present invention to provide a power control system having a function of circulation charging of electrical energy to continuously supply electricity to the load by using a small amount of external power.

To achieve this and other objectives, a power control system of the present invention includes a control unit, an electricity storing unit, a motor, and a generator set. The control unit includes a charging/driving controller, a motor controller, and a load controller. The charging/driving controller is electrically connected to the motor controller and the load controller, and a load is electrically connected to and controlled by the load controller. The motor is electrically connected to and controlled by the motor controller. The electricity storing unit is electrically connected to and controlled by the charging/driving controller for driving the motor. The generator set includes a revolving wheel, a driving power generator, and an energy storage generator. The revolving wheel is driven by the motor to simultaneously drive the driving power generator and the energy storage generator. The driving power generator is electrically connected to the load controller to provide electrical energy to the load, and the energy storage generator is electrically connected to the charging/driving controller to allow electrical energy generated by the energy storage generator to charge the electricity storing unit. When the generator set is broken down, the electricity of the electricity storing unit is provided to the load for working through a control of the charging/driving controller.

In a preferred form, the power control system further includes at least one input electricity generator electrically connected to the charging/driving controller, so that electrical energy generated by the input electricity generator can be input into the electricity storing unit.

According to the present invention, the at least one input electricity generator is preferably a wind power generator or a solar power generator.

According to the present invention, the revolving wheel is preferably mounted on a rotary shaft which is connected to an output shaft of the motor through a first transmission member. Both the driving power generator and the energy storage generator are mounted on a transmission shaft which is connected to the rotary shaft through a second transmission member.

According to the present invention, the revolving wheel is preferably an eccentric wheel or a flywheel.

According to the present invention, the power control system preferably further includes a localization/malfunction signal transmission modular which is electrically connected to the charging/driving controller for monitoring and reporting an operation status of output electricity of the generator set, an operation status of charging of the electricity storing unit, and an operation status and a location of the load.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

DETAILED DESCRIPTION OF THE INVENTION

Figure 1:
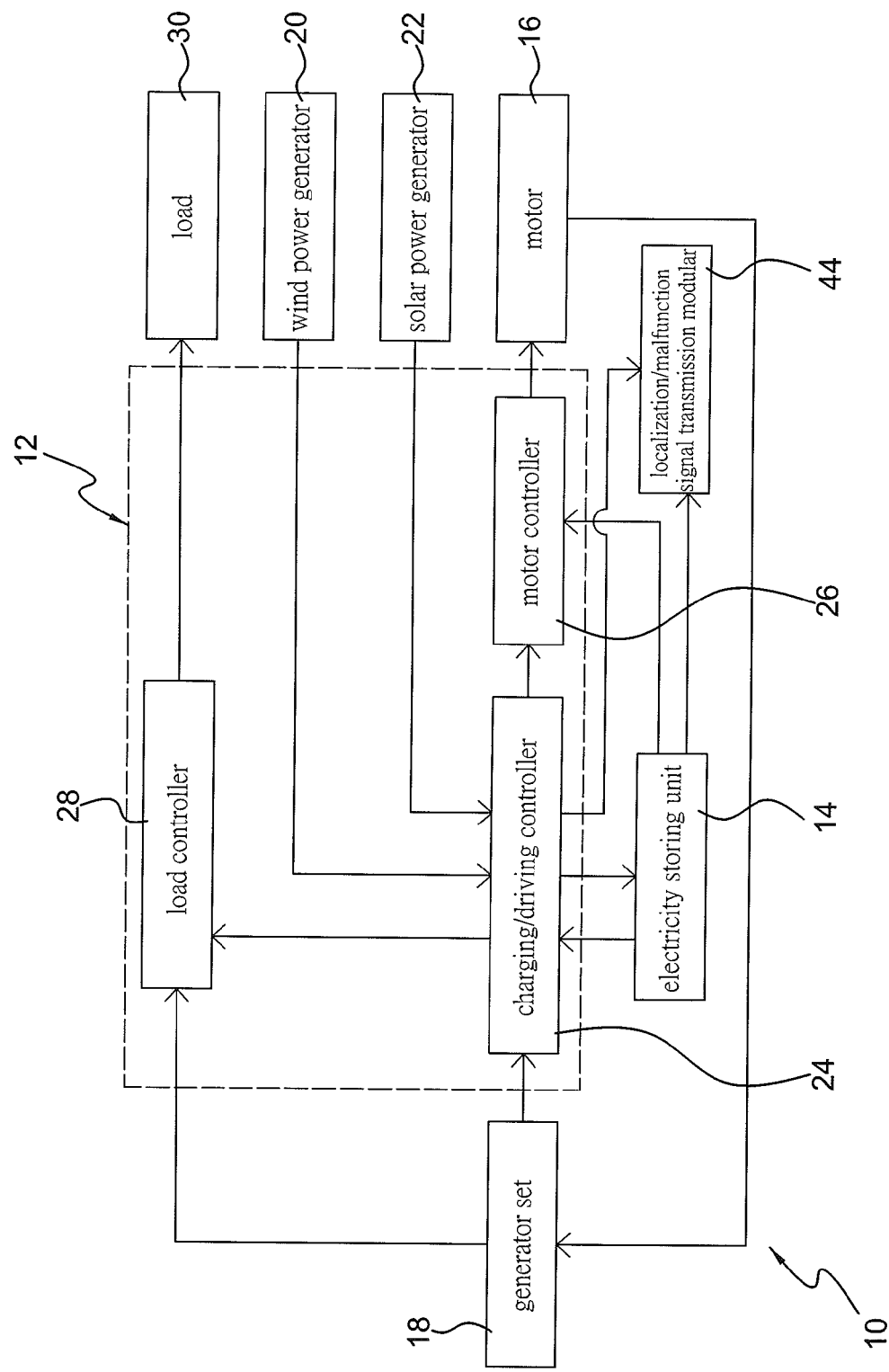
FIG. 1 is a schematic block diagram of a power control system for generating electricity and storing circulation energy of the present invention.
Figure 2:
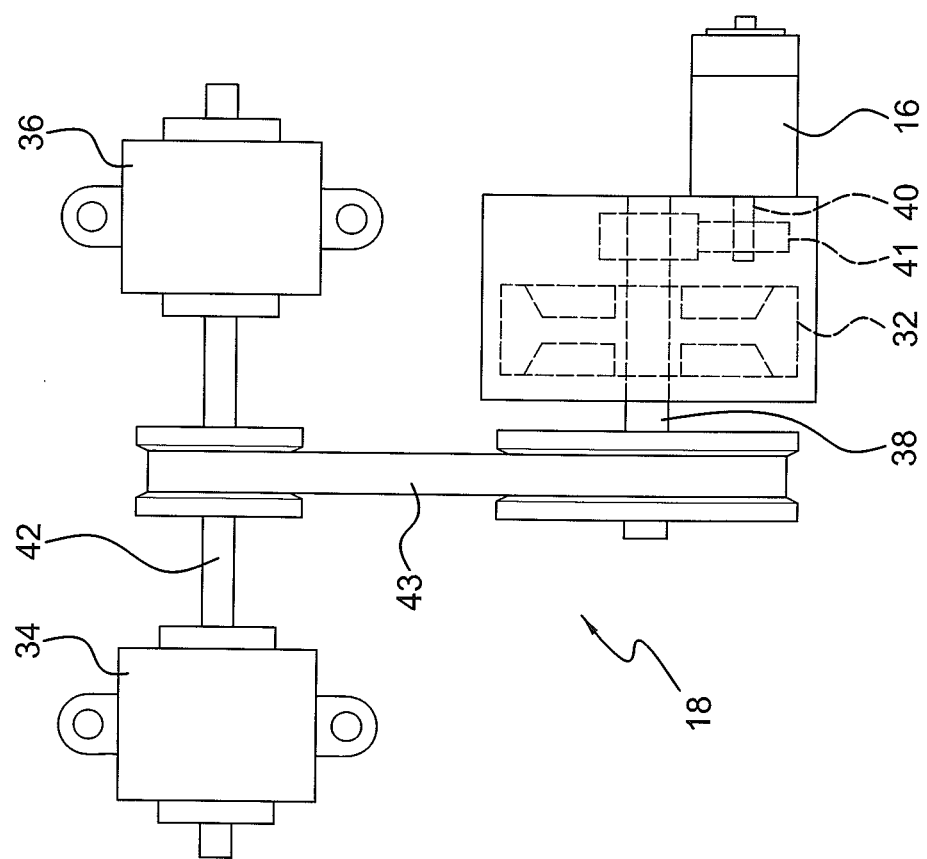
FIG. 2 a diagrammatic diagram showing a generator set of the power control system of FIG. 1.
Figure 3:
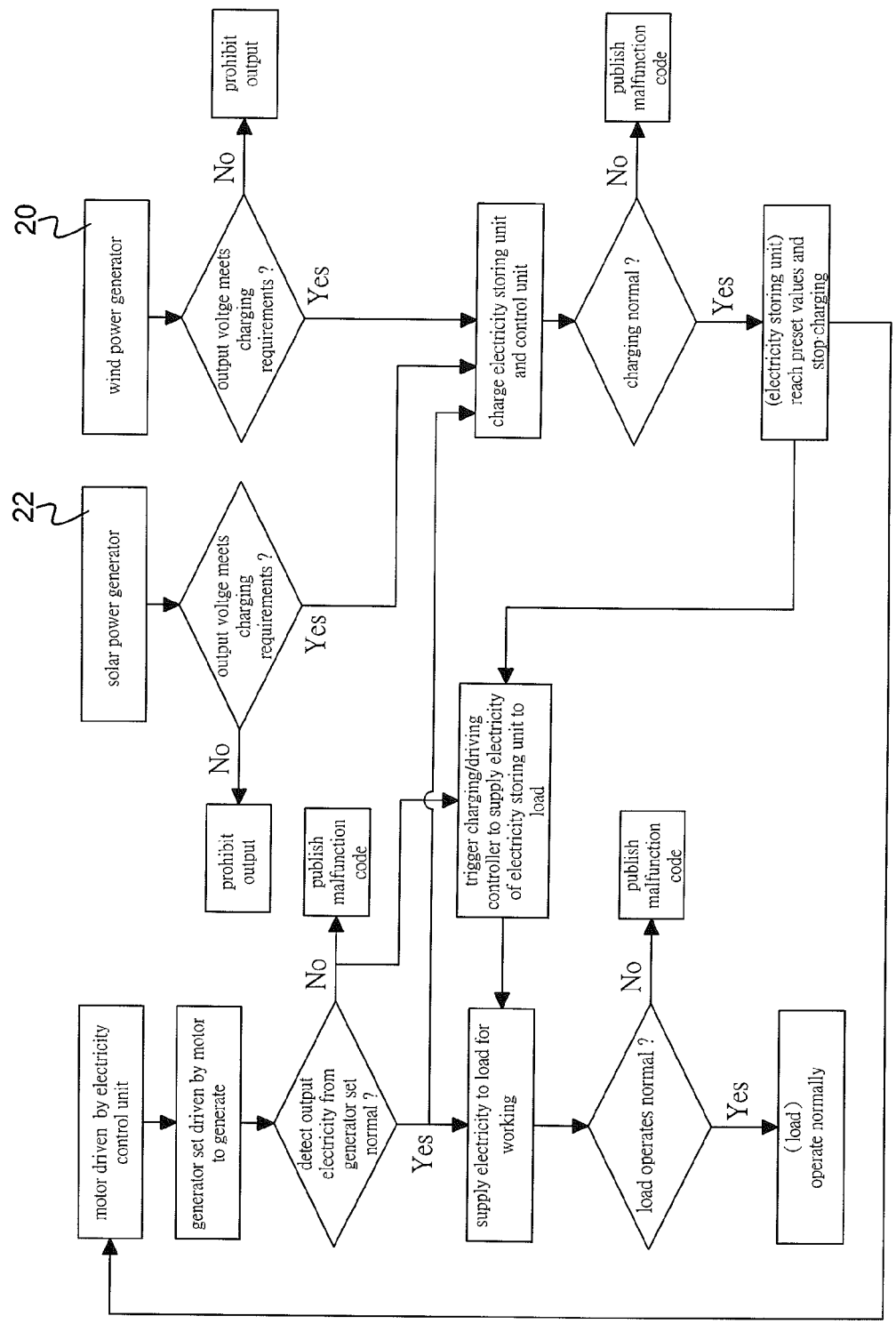
FIG. 3 is a flowchart showing control steps and malfunction processing of the power control system of FIG. 1.

A power control system 10 according to a preferred embodiment of the present invention is shown in FIGS. 1 through 3 of the drawings and including a control unit 12, an electricity storing unit 14, a motor 16, a generator set 18, and at least one input electricity generator. In this embodiment, the power control system 10 includes a first input electricity generator 20 and a second input electricity generator 22. The first input electricity generator 20 is a wind power generator and the second input electricity generator 22 is a solar power generator. The electricity storing unit 14 includes at least one battery.

The control unit 12 includes a charging/driving controller 24, a motor controller 26, and a load controller 28. The first and second input electricity generators 20 and 22 are electrically connected to the charging/driving controller 24. The electricity storing unit 14 is electrically connected to and controlled by the charging/driving controller 24, so that the electricity generated by the first and second input electricity generators 20 and 22 can be input into the electricity storing unit 14 for storing the electricity. The motor controller 26 and the load controller 28 are electrically connected to the charging/driving controller 24. The motor controller 26 is electrically connected to the motor 16 for controlling the electricity in the electricity storing unit 14 to drive the motor 16. The load controller 28 is electrically connected to a load 30, and the electricity in the electricity storing unit 14 can be supplied to the load 30 for operating through a control of the charging/driving controller 24.

The generator set 18 includes a revolving wheel 32, a driving power generator 34, and an energy storage generator 36. The revolving wheel 32 is mounted on a rotary shaft 38. The rotary shaft 38 is connected to an output shaft 40 of the motor 16 through a transmission member 41 such as a belt, so as to drive the revolving wheel 32 by the motor 16 and to generate effects of boosting and conversion of kinetic energy. Both the driving power generator 34 and the energy storage generator 36 are mounted on a transmission shaft 42 which is connected to a transmission member 43 such as a belt, so that the driving power generator 34 and the energy storage generator 36 can be simultaneously driven by the revolving wheel 32 to generate electricity. The load controller 28 is electrically connected to the driving power generator 34 of the generator set 18, so that the electricity generated by the driving power generator 34 can be supplied to the load 30 under normal status. The energy storage generator 36 of the generator set 18 is electrically connected to and controlled by the charging/driving controller 24, allowing the electrical energy generated by the energy storage generator 36 to charge the electricity storing unit 14. In one example, the revolving wheel 32 is an eccentric wheel which can generate boosting kinetic energy having combination of an eccentric force and gravitational acceleration by the rotation of the revolving wheel 32. In another example, to meet requirements of storing rotational kinetic energy having combination of an eccentric force and gravitational acceleration, the revolving wheel 32 is a flywheel.

The power control system 10 further includes a localization/malfunction signal transmission modular 44. The localization/malfunction signal transmission modular 44 is electrically connected to the charging/driving controller 24 for detecting a status of charging requirements of output voltages of the first and second input electricity generators 20 and 22, a status of normality of an output electricity generated by the generator set 18, a status of normality of charging of electricity storing unit 14, and a location and a status of normality of an operation of the load 30, which are processed by the charging/driving controller 24 and transmitted to a monitoring platform by wireless communication such as General Packet Radio Service (GPRS), to manage a real-time control of operational states and working efficiency of the electricity storing unit 14, the generator set 18, the first and second input electricity generators 20 and 22 and the load 30 and to report malfunction information in time, to facilitate repairing and to achieve function of all-day localization, burglarproof and fault alarm.

Referring to FIGS. 1 and 2, in an operation mode of the power control system 10, the electricity of the electricity storing unit 14 is controlled by motor controller 26 to drive the motor 16, and the motor 16 drives the generator set 18 to generate electricity. The electrical energy generated by the driving power generator 34 is supplied to the load 30, and the electricity storing unit 14 is charged by the electricity generated by the energy storage generator 36. The electricity storing unit 14 is also charged by the electricity generated by the external first and second input electricity generators 20 and 22 through the charging/driving controller 24. Thus, the electricity of the electricity storing unit 14 is sufficient to drive the motor 16 to work to make sure that a small amount of external power supplied will provide continuous electricity to the load 30 to operate. During the operation of working, if the generator set 18 is broken down, the charging/driving controller 24 will control the electricity storing unit 14 to directly supply electricity to the load 30 through the load controller 28.

As an example, the load 30 is one or more LED lamps. When the load 30 is a street lamp, the electricity storing unit 14 is charged by the electricity generated by the first and second input electricity generators 20 and 22 in day time. In the meantime, the motor controller 26 will stop operation of the motor 16, so that at night time the electricity of the electricity storing unit 14 is sufficient to drive the motor 16 and the generator set 18 to work so as to drive the street lamp to light at night.

Referring to FIG. 3, in a fault alarm mode of the power control system 10, the output voltage of the first and second input electricity generators (wind power and solar power generators) 20 and 22 is detected to meet the requirements and to be normal or not. When the charging requirements are met, the electricity storing unit 14 is charged by the first and second input electricity generators 20 and 22. When the charging requirements are not met, the electricity of the first and second input electricity generators 20 and 22 is not allowed to be output. When the electricity storing unit 14 is charged, the charging is detected to be normal or not. If the charging is not normal, a malfunction code is published by the localization/malfunction signal transmission modular 44. Furthermore, when the motor 16 drives the generator set 18, a quantity of output electricity of the generator set 18 is detected to be normal or not. If the quantity is not normal, a malfunction code is published by the localization/malfunction signal transmission modular 44. The operation of the load 30 is detected to be normal or not. If the operation is not normal, a malfunction code is published to notify maintenance staff to repair.

In conclusion, the motor 16 of the power control system 10 is started to drive the revolving wheel 32 to generate boosting kinetic energy. In the meantime, the electricity generated by the driving power generator 34 drives the load 30, and the electricity generated by the energy storage generator 36 results in that the electricity storing unit 14 is charged to achieve energy circulation effect. Thus, at low energy consumption condition, sufficient electricity is supplied to the load 30 to operate. When the generator set 18 is broken down, the electricity storing unit 14 is controlled by the charging/driving controller 24 to directly supply electricity to the load 30. Thus, stable electricity is supplied to the load 30 to work. Natural energy of wind power and/or solar power is supplied to the electricity storing unit 14 to supplement from external environment to achieve environment protection and security objective and to meet living, industry and public lighting electricity demands.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A power control system for generating electricity and storing circulation energy comprising:

a control unit including a charging/driving controller, a motor controller, and a load controller, with the charging/driving controller electrically connected to the motor controller and the load controller, with a load connected to and controlled by the load controller;

a motor electrically connected to and controlled by the motor controller;

an electricity storing unit electrically connected to the charging/driving controller, with electrical energy in the electricity storing unit controlled by the charging/driving controller for driving the motor; and a generator set including a revolving wheel, a driving power generator, and an energy storage generator, with the revolving wheel driven by the motor to simultaneously drive the driving power generator and the energy storage generator, with the driving power generator electrically connected to the load controller to provide electrical energy to the load, with the energy storage generator electrically connected to the charging/driving controller to allow electrical energy generated by the energy storage generator to charge the electricity storing unit, wherein when the generator set is broken down, the electricity of the electricity storing unit is provided to the load for working through a control of the charging/driving controller.

2. The power control system as claimed in claim 1, further comprising:

at least one input electricity generator electrically connected to the charging/driving controller for inputting electrical energy into the electricity storing unit.

3. The power control system as claimed in claim 2, wherein the at least one input electricity generator includes at least one of a wind power generator and a solar power generator.

4. The power control system as claimed in claim 1, wherein the revolving wheel is mounted on a rotary shaft, with the rotary shaft connected to an output shaft of the motor through a first transmission member, with both the driving power generator and the energy storage generator mounted on a transmission shaft, with the transmission shaft connected to the rotary shaft through a second transmission member.

5. The power control system as claimed in claim 1, wherein the revolving wheel is an eccentric wheel.

6. The power control system as claimed in claim 1, wherein the revolving wheel is a flywheel.

7. The power control system as claimed in claim 1, further comprising:

a localization/malfunction signal transmission modular which is electrically connected to the charging/driving controller for monitoring and reporting an operation status of output electricity of the generator set, an operation status of charging of the electricity storing unit, and an operation status and a location of the load.

* * * * *